April 2, 1957   J. W. NORTHRUP ET AL   2,787,417
GEOLOGICAL ANOMALY GRAVITY ANALOG COMPUTER
Filed July 30, 1953   3 Sheets-Sheet 1

INVENTORS
JOSEPH W. NORTHRUP
GLENN A. SCHURMAN
BY
ATTORNEYS

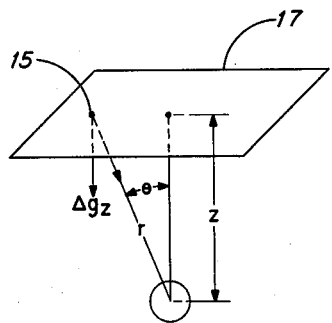
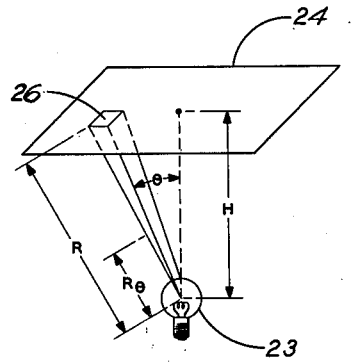
FIG.3       FIG.5
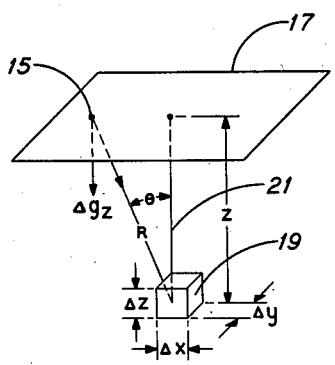
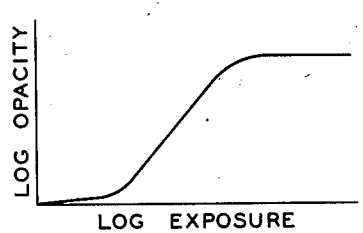
FIG.4       FIG.6

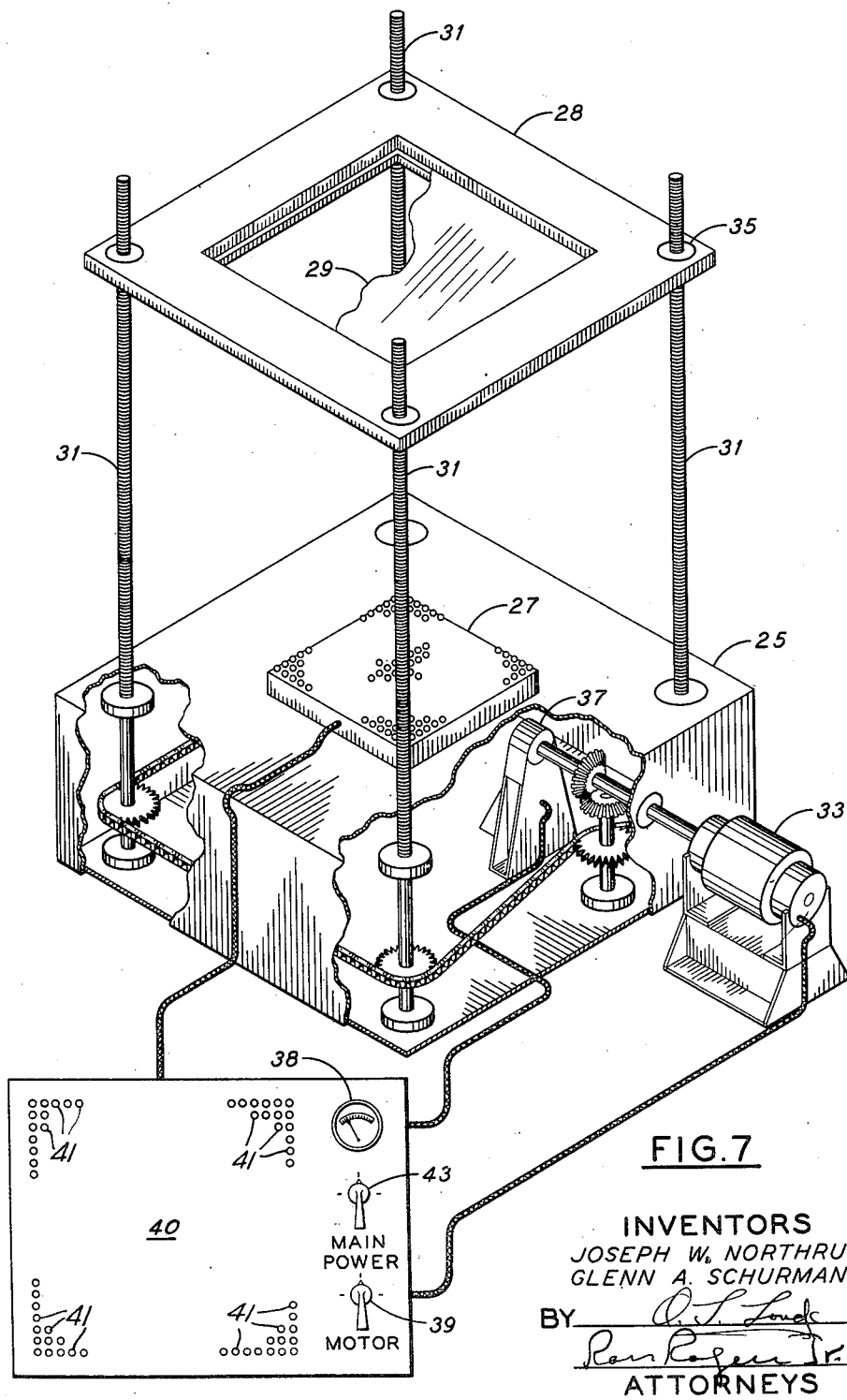

United States Patent Office 2,787,417
Patented Apr. 2, 1957

2,787,417

GEOLOGICAL ANOMALY GRAVITY ANALOG COMPUTER

Joseph W. Northrup, New Orleans, La., and Glenn A. Schurman, Whittier, Calif., assignors to California Research Corporation, San Francisco, Calif., a corporation of Delaware Application July 30, 1953, Serial No. 371,392

2 Claims. (Cl. 235—61)

Our invention relates to a method of geophysical prospecting and more particularly relates to a method and apparatus for determining the vertical component of gravity at any desired point in the vicinity of a known geological anomaly.

It has long been appreciated that it would be desirable to be able to accurately and rapidly evaluate the effect of a geological anomaly of known density and dimensions in order to determine the presence of unknown geological anomalies in the vicinity.

In the interpretation of gravitational surveying information, it is customary to employ a contour map developed from a plurality of mapping points correlated with the coordinate system of the map. In the vicinity of a known geological anomaly of lesser or greater density, it has been assumed that the contour map shows the effect of the mass configuration of a single anomaly. However, the contour map may show the effects of a plurality of anomalies which are separate from each other but located close together, and it is often important to determine if an unknown anomaly lies in the vicinity of the known anomaly. To determine if the contour map is due entirely to the known anomaly, it is necessary to determine the gravitational effect of the known anomaly.

Where an anomaly has been well defined by drilling, the size and shape, as well as the density distribution, are generally known, and from this information the gravitational field due to the known anomaly may be determined. However, in actual practice this determination has rarely been attempted due to the complexity of the mathematical problem involved in determining the vertical component of gravity for even a few particular points at the earth's surface in the vicinity of the anomaly. Accordingly, while it has been appreciated that other adjacent anomalies, such as a very deep-seated salt dome, or other comparable structure, may affect the gravity contour map of the area, there has been no practical means for determining the existence of such a structure without actual exploratory drilling.

It is therefore an object of the present invention to provide a method of geophysical surveying which makes it possible to determine rapidly and accurately the vertical component of gravity at any desired point on the earth's surface due to known arbitrary three-dimensional mass distribution within the earth.

It is a further object of the invention to provide a method of apparatus for determining the presence of anomalies in geological structure in the vicinity of an anomaly of known dimensions and density.

It is another object of the invention to provide a method of interpretation of gravitational surveying information to permit the comparison of the gravitational effect of an anomaly of known dimensions with a gravitational field map obtained by normal gravity surveying operations.

It is a further object of our invention to provide an apparatus and method for applying the analogy between the radiation from a point source and the gravitational field from a small mass to compute the theoretical gravity effect of a subsurface anomaly.

The novel features of our invention are set forth with more particularity in the accompanying claims. The invention itself, however, with respect to the details thereof, together with its additional objects and advantages may be better understood from the following description of a specific embodiment thereof with reference to the accompanying drawings:

Fig. 3 is a schematic representation of the gravitational attraction at a point on a datum plane, of a point mass buried below the datum plane.

Fig. 4 is a schematic representation of the vertical gravitational attraction at a point on a datum plane, of a prismatic mass below the datum plane.

Fig. 5 is a schematic representation of the light incident on an area from a point source of light adjacent to the area.

Fig. 6 is a graph of the relationship between opacity and exposure for a photographic film.

Fig. 7 is a schematic representation of a computer according to our invention.

Figure 1:
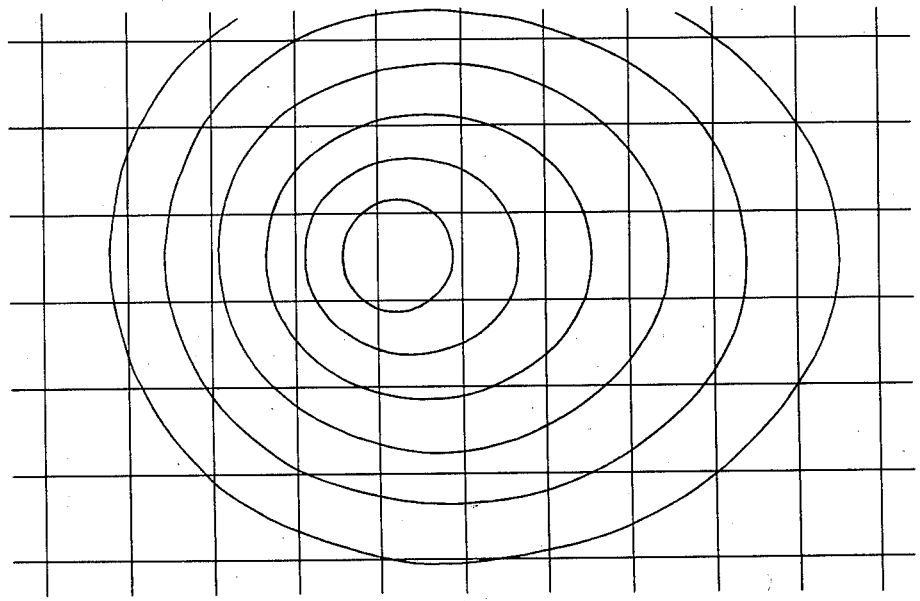
Fig. 1 is a schematic representation of a typical contour map obtained by conventional gravity meter or torsion balance methods of geophysical surveying.
Figure 2:
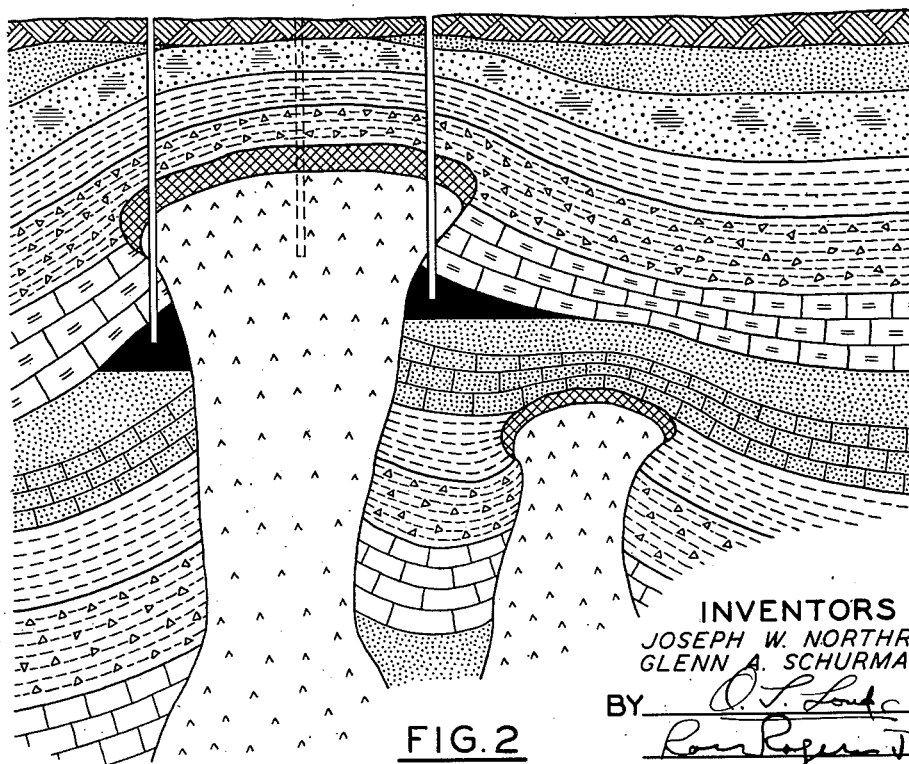
Fig. 2 represents a cross-section of a salt dome formation of dimensions and density capable of producing a contour map as illustrated in Fig. 1.

Referring now to the drawings, and in particular to Figs. 1 and 2, there is shown a typical gravity contour map constructed in the usual manner from information developed by gravitational surveying by either a gravity meter or a torsion balance means. The type of contour map shown in Fig. 1 is generally developed by the taking of gravity measurements at predetermined spaced intervals or stations on the surface of the earth. This type of contour map is usually made after each station or mapping point in the coordinate system has been corrected to a starting or datum plane so that the contour lines represent equipotential lines on a single plane resulting from anomalies below that plane; i. e., regional gradients and variations from surface irregularities are removed.

Fig. 2 illustrates a cross-section of the region for which Fig. 1 is a contour map. As shown in Fig. 2, the contour map of Fig. 1 may be influenced by the presence of two similar salt domes of the type encountered in the Gulf Coast region where the use of gravitational surveying methods has been particularly successful. Gravitational forces at the earth's surface are generally reduced in the vicinity of the salt dome. For this reason, the equipotential lines in Fig. 1 represent relative decrease in gravitational attraction as the point above the center of the dome is approached. However, in those salt domes where oil has been found, there is generally associated with the dome a cap rock of greater density than salt and frequently even greater density than the surrounding sedimentary formations. For this reason, the contour lines directly over the central portion of the dome will generally represent greater gravitational force than the contour lines immediately around the central closure. While the contour lines in Fig. 1 are shown to be deflected toward the right due to the presence of the smaller salt dome at the right-hand side of the larger dome, it will be appreciated by those skilled in the art that the lack of symmetry of the contour lines directly over the larger dome may be due to the irregularities of the larger dome itself, such as by a protruding nose formation on the upper flank of the larger dome, or by other types of irregularities or anomalies in the subsurface geology. For this reason, mere inspection of the contour map presents an indeterminate problem as to the exact anomaly beneath the surface producing that particular contour.

In view of the impossibility in predicting the exact nature of the subsurface formation by inspection of the gravity contour map, it has long been appreciated that some means of evaluating the effect of a particular, known anomaly on the map obtained by surveying methods would provide a useful tool in predicting the presence or absence of additional structures favorable for the accumulation of oil. For example, as illustrated in Fig. 2, the larger salt dome is shown to have been productive of oil and hence the outlines, dimensions and density of the salt in the vicinity of the dome have been well defined by actual drilling operations. However, where a three-dimensional mass, such as the larger dome, produces a contour map such as that shown in Fig. 1, the only practical means for detecting the presence of the smaller dome prior to this invention has been by actual drilling practices representing a large investment in time and materials. While theoretical methods of calculating the effect of the larger dome have been described in the literature, the time and expense in obtaining the effect by conventional mathematical methods has made this alternative less attractive than the actual drilling of potentially favorable areas.

For example, in Exploration Geophysics, by J. J. Jakosky, page 356 ff., there are set forth a number of elaborate equations for calculating the gravitational effect of subterranean anomalies. The procedure therein recommended is that the anomaly be divided into a number of elementary prisms each having a shape which may be calculated from the equations given in the reference. In order to obtain reasonable accuracy, each anomaly must be divided into several prisms, and the gravitational effect at a number of points on the earth's surface must be calculated. The number of calculations to be performed, then, is equal to the number of points on the earth's surface at which the gravitational attraction is to be determined, multiplied by the number of elementary volumes into which the anomaly is divided. The book states: "The calculations are obviously quite lengthy." The above-described method of performing the calculations is rarely employed because it is so time consuming.

Experience has indicated that even simpler methods than those referred to above of computing the gravitational effect of a subsurface anomaly are time consuming and expensive. A calculation of the gravitational effect of a subsurface anomaly which was believed to present a problem of average difficulty has been performed by such simpler methods. To obtain the effect of gravity at a hundred points, two computers employed grid templates for dividing the anomaly into elementary prisms and curves to introduce the distance element in the calculation of the gravitational effects of the elementary prisms. Two computers were capable of solving such a problem in approximately five months. It is believed that the same problem can be solved in four or five days with the use of our gravity analog computer.

To facilitate the solution of such problems, we have devised a simple analog computer which determines the gravitational effect of a subsurface anomaly. According to our method, the anomaly is arbitrarily divided into a number of unit prisms, and the gravitational effect of each prism at each desired point on the surface of the earth is calculated by use of this computer. Successively the effects of each of the other prisms at each appropriate point on the earth's surface are combined with the previously calculated values until the total gravitational effect of the anomaly is determined.

For the better understanding of our invention, we will derive an equation for the vertical component of gravitation due to a known subsurface anomaly and compare it with the equations derived to express the total amount of light falling on a plane surface due to the presence of a number of unit light sources. We have found that the form of these equations for light and that of gravity is similar and that a computer indicating the effect of light on a plane photographic film, as explained hereinafter, may be used to indicate the effect of gravity. This correspondence between the effect of gravity and of light will be demonstrated mathematically, and apparatus for using the analogy to compute the vertical component of gravity will be described.

Equations for the vertical component of gravity at any point due to a mass of known dimensions may be derived from the equation for the attraction between two bodies of masses $m_1$ and $m_2$:

$$F = k \frac{m_1 m_2}{R^2} \quad (1)$$

where $k=$ the gravitational constant
$R=$ the distance between the bodies
$F=$ the force of gravitational attraction The gravitational force ($\Delta g$) per unit mass at $m_1$ resulting from $m_2$ is:

$$\Delta g = k \frac{m_2}{R^2} \quad (2)$$

If $m_2$ is a small cube with the dimensions $\Delta x$, $\Delta y$, and $\Delta z$, the expression for $\Delta g$ may be written:

$$\Delta g = \frac{\rho k \Delta x \Delta y \Delta z}{R^2} \quad (3)$$

where:

$\rho=$ the density difference between the mass and the surrounding material or $$\Delta g = \frac{\rho k \Delta A \Delta z}{R^2}$$

where:

$\Delta A=$ the area of one face of the prism $\Delta x \Delta y$.

We are interested in the vertical component of gravity, which may be expressed:

$$\Delta g_z = \frac{k \rho \Delta A \Delta z}{R^2} \quad (4)$$

where $\theta$ is the angle between the vertical and the line joining the observation point and the cube. The meaning of Equation 4 can be better understood by reference to Fig. 4, which indicates diagrammatically quantities which are combined in Equation 4.

In Fig. 4, the reference numeral 15 designates the point at which gravitational attraction is to be determined. The plane 17 represents a horizontal datum plane to which the gravitational determinations are to be referred. $\Delta g_z$ is a vector perpendicular to reference plane 17 and indicates the direction of the vertical component of gravity at the point 15. The reference prism 19, having dimensions $\Delta x$, $\Delta y$, and $\Delta z$, is at a distance $z$ below the reference plane. The line 21 is a normal to the reference plane at the center of the prism 19. R is the distance along the line between the center of the prism 19 and the point 15. $\theta$ is the angle between the line 21 and R.

Equation 4 for $\Delta g_z$ is applicable to every point 15 on the reference plane 17 and can be applied to the determination of the gravitational effect of a large body below the reference plane 17 in the following manner. The subsurface body is first divided into a large number of prisms lying between equally-spaced parallel horizontal planes and equally-spaced parallel vertical planes and a third set of parallel equally-spaced vertical planes perpendicular to the first set of vertical planes. The larger body is then considered as consisting of a large number of similar prisms lying between the planes.

The total effect of gravity at the point 15 due to the larger body is equal to the sum of the effects at the point 15 of the individual prisms. In summation form, the resulting equation is:

$$g_z = \sum_{n=1}^{n=\alpha} \frac{k\rho \Delta A \Delta z \cos \theta_n}{R_n^2} \quad (5)$$

where $\alpha$ is the number of prisms into which the large body is divided. Equation 5 is a statement of the gravitational problem.

The gravitational equation is now in the form useful for solving the present problem. The equation for the total amount of light falling on a unit area from a point source displaced from this area will now be derived in a form which will reveal its correspondence to the above statement of the gravitational problem.

The intensity ($I$) of a light field at a distance R from a point source is given by the relationship:

$$I = I_0 \left[\frac{R_0}{R}\right]^2 \quad (6)$$

where:

$I_0$ = the intensity of the light field at the radius $R_0$
$I$ = the intensity of the light field at the radius $R$ The intensity of light at a point on a plane is given by the relationship:

$$I = I_0 \left[\frac{R_0}{R}\right]^2 \cos \theta \quad (7)$$

where $\theta$ is the angle between a normal to the plane and the direction of a ray from a point source to the point on the plane.

Referring to Fig. 5, a unit source of light 23 is placed adjacent to a reference plane 24. The light is at a distance H from the plane. Intensity of light is to be determined in the area 26 on the plane. The light is at a distance R from the area 26. $\theta$ is the angle between the normal to the plane 24 and the line between the light 23 and the area 26.

The energy incident on a unit area in the area 26 in a time $\Delta t$ is:

$$E = I\Delta t = I_0 \left[\frac{R_0}{R}\right]^2 \cos \theta \Delta t \quad (8)$$

If several exposures are made with the source at different distances from the film at several exposures, each of the duration $\Delta t$, the total energy received at a given point is the sum of the energy received from each exposure. Thus, $$E_t = \sum_{n=1}^{n=\alpha} \frac{I_0 r_0^2}{r_n^2} \cos \theta_n \Delta t \quad (9)$$

where:

$\Delta t$ = the exposure time
$r_n$ = the distance between the $n$th light source and the point at which the energy is to be determined
$\theta$ = the angle between the normal to the reference plane and the direction of $r_n$ If $\Delta t$ and $I_0$ are maintained constant for all values of $n$, the functional relationship between $E$ and $r$ is the inverse square law, and the functional form of Equation 9 is the same as that of Equation 5. Restating Equation 9, $$E = I_0 r_0^2 \Delta t \sum_{n=1}^{n=\alpha} \frac{\cos \theta_n}{r_n^2} \quad (9a)$$

Restating Equation 5, $$g_z = k\rho \Delta A \Delta z \sum_{n=1}^{n=\alpha} \frac{\cos \theta_n}{R_n^2} \quad (5a)$$

if $k\rho \Delta A \Delta z$ equals a constant. Introducing the scale factor $\beta$ between the analog and the prototype, Equation 5a becomes:

$$g_z = k\rho \Delta a' \beta \Delta z' \sum_{n=1}^{n=\alpha} \frac{\cos \theta_n}{r_n^2} \quad (5b)$$

where $\Delta z'$ and $r_n$ are scaled distances in the analog computer and $\Delta a' = a^2$ where $a$ is the distance between point sources in the computer, i. e., scaled area of the face of a given prism. If the limit $\alpha$ is selected to be the same in the two equations above, and Equation 9a is substituted into 5b, then:

$$g_z = \frac{a^2 k\rho \beta \Delta z'}{I_0 \Delta t r_0^2} E \quad (10)$$

where:

$a$ = distance between sources in the computer
$k$ = universal gravitational constant
$\rho$ = density difference between anomaly and surrounding material
$\beta$ = scale factor
$\Delta z'$ = scaled depth of prism, i. e., distance film is moved between exposures ($=\Delta z/\beta$)
$I_0$ = intensity of source at $r_0$
$\Delta t$ = exposure time, equals constant Equation 10 then sets forth the fundamental relationship on which our gravity analog computer is based.

Fig. 7 shows a computer according to our invention. A frame 25 is provided which supports an anomaly board 27 and spaced therefrom a film holder 28, in which is placed a photographic film 29. Threaded columns 31 rotatably mounted on the base support the film holder by engaging complementary threaded members 35, rigidly affixed at its four corners. A motor 33 is provided to rotate the columns 31 in synchronism, thereby elevating or lowering the film holder 28 as the threaded members 35 at its corners move along the threaded columns 31. A revolution counter 37 is connected to the motor and control panel 40 and indicates the number of turns made by the motor 33. A motor control connected to a switch 39 causes the motor to make a predetermined number of revolutions in response to operation of the switch in a manner well known in the art and thus not shown here. The anomaly board 27 comprises a large number of small lights of equal intensity spaced at regular intervals on the board. A switch array 41 on the control panel 40 controls the operation of each individual light.

The computer is used to determine the gravity effect at the reference plane of a known anomaly. This effect can then be subtracted from the total effect of gravity at the reference plane to determine what effect may result from unknown anomalies, and hence to determine if unknown anomalies are present.

Before using the computer to determine the vertical component of gravity at points in the vicinity of, and resulting from, a known anomaly, the operator obtains information as to the cross-section and density of the anomaly at regularly spaced intervals along its vertical dimension. He begins to compute the gravitational effect of the anomaly beginning, for example, at its lowermost portion. To accomplish this, with the power switch 43 open, he operates the switch array 41 on the control panel 40 to turn on the switches associated with lights corresponding in configuration to the selected cross-section of the anomaly when the anomaly is reduced to such a scale that its largest cross-section would fall within the dimensions of the anomaly board. After the appropriate switches in the array 41 have been placed in contact, the main power switch is turned on, lighting the pre-selected configuration of lights on the anomaly board 27 for a predetermined period of time.

The lights on the anomaly board are then turned off and the motor switch 39 is actuated to move the film holder downward a predetermined distance corresponding to the distance between the cross-sections of the anomaly which have been selected and having regard for the scale factor selected with respect to the anomaly board. The appropriate switches for the second cross-section are actuated on the array 41, and the main power switch is turned on for the same predetermined interval of time. The operator continues the process of selecting the appropriate lights on the anomaly board corresponding to the cross-section of the anomaly at a predetermined height, switching the power to the selected lights for a predetermined period of time, then, with the anomaly board lights off, moving the film holder a predetermined distance to the points corresponding to the next cross-section. At the end of this series of operations, the film 29 has been exposed irregularly corresponding to the varying amounts of light which reach different points on its surface.

The film is developed to darken the exposed areas in accordance with the variable amount of light each has received, and the results are analyzed. For the first stage of the analysis a densitometer is employed to measure the variations in degree of opacity of the film throughout its total area. While the density of a portion of the film is related to the amount of light that has fallen on it, this relationship is not linear. The relationship between the log of the exposure, where exposure is a measure of the total amount of light which fell on the film versus the log of opacity, is illustrated in Fig. 6.

The densitometer gives a reading of opacity, and reference to a curve of the form shown in Fig. 6 permits a determination of exposure. When the total exposure, E, of a portion of the film is obtained, the operator refers back to Equation 10, multiplies the exposure by the appropriate constant, in this case $$\frac{a^2 k \rho \beta \Delta z'}{I_0 \Delta t r_0^2}$$

and obtains the vertical component of gravity for a point corresponding to that portion. Opacity measurements are made at regularly-spaced intervals on the photographic sheet corresponding to the grid of a gravity map, and the gravity at these points is obtained. A gravity contour map may then be prepared for comparison with the contour map obtained from the direct measurement of gravity. The value of gravity at the various points on the grid obtained from the computed gravity map is subtracted from the measured values of gravity at the corresponding points, and a contour map of the difference in gravitational attraction may be prepared. This difference in gravitational attraction represents the effect of unknown anomalies.

While we have shown and described one specific embodiment of our analog computer, we are aware that many modifications thereof may be employed without departing from the scope of the invention. For example, photocells or other light-sensitive elements may be employed in place of the photographic film in order to determine the distribution of light from the anomaly board. These elements would be selected or calibrated so that the current is delivered as a linear function of the intensity of the light falling on the tubes. In such apparatus the photocells are arranged in a grid structure with their photo-sensitive surfaces in a plane that would otherwise have been occupied by the photographic film. Each photocell is connected to a separate integrating pickup circuit. The total current to the pickup is then analogous to exposure. By proper calibration of the indicator associated with the photocells, a reading may be obtained in terms of vertical components of gravity directly.

The computer may be constructed so that its operation is automatic. The film holder in this case would move with a constant velocity, the magnitude of which is given by Equation 10 and is equal to $$V = \frac{\Delta z'}{\Delta t}$$

The light sources corresponding to the segments in the mass anomaly would be controlled automatically. This could be accomplished by controlling each light with a double contact switch. The switches in turn would be coupled to the film holder so that they would go through one cycle as the film holder moved a specified distance. The contacts of every switch would be set so the light source would be turned on and off at the correct scale heights. These positions correspond to the positions in space of the top and bottom of the rectangular prisms in the mass anomaly.

Accordingly, we do not intend that our invention be limited except in accordance with the appended claims.

We claim:

1. Apparatus for simulating the vertical component of gravity in a horizontal plane due to the presence of a known gravitation anomaly by subdividing said anomaly into a plurality of incremental volumes spaced different distances from said plane, comprising a plurality of light sources lying in a simulated anomaly plane parallel to said horizontal plane, said sources having relative positions in said anomaly plane corresponding to the relative positions of said incremental volumes, means for selectively energizing said light sources to correspond to different cross-sections of said anomaly, a light-sensitive surface corresponding to said horizontal plane and disposed in a plane parallel to the plane of said light sources, the different portions of said light-sensitive surface being capable of integrating the illumination received thereby, and means for successively positioning said light sources and said light-sensitive surface at different distances from each other corresponding to different cross-sections of said anomaly, said light-sensitive surface being exposed at each of said successive positions to illumination for a predetermined time from the selected light sources corresponding to said different cross-sections of said anomaly, whereby the overall exposure on the different portions of said light-sensitive surface is a measure of the vertical component of gravity at the corresponding different portions of said horizontal plane.

2. Apparatus for simulating the vertical component of gravity in a horizontal plane due to the presence of a known gravitation anomaly by subdividing said anomaly into a plurality of incremental volumes spaced different distances from said plane, comprising a plurality of light sources lying in a simulated anomaly plane parallel to said horizontal plane, said sources having relative positions in said anomaly plane corresponding to the relative positions of said incremental volumes, means for selectively energizing said light sources to correspond to different cross-sections of said anomaly, a photographic film corresponding to said horizontal plane and disposed in a plane parallel to the plane of said light sources, the different portions of said film being capable of integrating the illumination received thereby, and means for successively positioning said light sources and said film at different distances from each other corresponding to different cross-sections of said anomaly, said film being exposed at each of said successive positions to illumination for a predetermined time from the selected light sources corresponding to said different cross-sections of said anomaly, whereby the overall exposure on the different portions of said film is a measure of the vertical component of gravity at the corresponding different portions of said horizontal plane.

References Cited in the file of this patent

UNITED STATES PATENTS

| | | |
|---|---|---|
| 2,054,237 | Bennett | Sept. 15, 1936 |
| 2,359,784 | Paulas | Oct. 10, 1944 |